United States Patent [19]
Burgess et al.

[11] 3,710,049
[45] Jan. 9, 1973

[54] SWITCHES FOR TURN SIGNAL AND HAZARD WARNING LIGHTS

[75] Inventors: James P. Burgess, Brighton; Melvin W. Polkinghorn, Livonia; Gunther Dieterle, Rochester, all of Mich.

[73] Assignee: International Telephone and Telegraph Corporation, New York, N.Y.

[22] Filed: May 28, 1971

[21] Appl. No.: 147,751

[52] U.S. Cl. ............................200/61.27, 200/16 R
[51] Int. Cl. .......................................H01h 3/16
[58] Field of Search .................200/61.27–61.38, 200/61.54, 164 R

[56] References Cited

UNITED STATES PATENTS

| | | | |
|---|---|---|---|
| 1,774,801 | 9/1930 | Macke et al. | 200/16 B |
| 3,193,630 | 7/1965 | Shlesinger | 200/16 B |
| 3,641,493 | 2/1972 | Suzuki et al. | 200/61.27 |
| 3,665,130 | 5/1972 | Suzuki | 200/61.27 |
| 3,459,909 | 8/1969 | Winogrocki et al. | 200/61.34 |
| 1,857,875 | 5/1932 | Salinas | 200/11 J |
| 3,591,740 | 7/1971 | Kolster | 200/61.27 |
| 3,557,328 | 1/1971 | Winogrocki | 200/61.27 |
| 3,530,266 | 9/1970 | Vitaloni | 200/61.34 |

*Primary Examiner*—Robert K. Schaefer
*Assistant Examiner*—M. Ginsburg
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

Switches are disclosed for controlling turn signal and hazard warning lights in automotive vehicles. The switches are concentrated in a small space in the steering column. Use is made of movable contact carriers in association with rotatable ball and leaf spring contacts to enable establishment of a number of different circuits. Elements are provided to enable lane change indications to be signalled without latching the switch and permitting cancellation of the lane change signal simply by release of the turn signal lever. Automatic return to neutral is provided for latched turn indications. A separate hazard warning control enables hazard warning signals through common switching elements regardless of the condition of the turn signal circuits.

20 Claims, 8 Drawing Figures

ALL "OFF"

"RIGHT" ON

"LEFT" ON

"TURN" OFF - "HAZARD" ON

SWITCHES FOR TURN SIGNAL AND HAZARD WARNING LIGHTS

BACKGROUND OF THE INVENTION

The present invention relates to warning signal devices for use in motor vehicles. It particularly relates to turn signal and hazard warning signals which may be switched "on" under control of the driver of a vehicle to provide visual signals signifying his intention to make a turn or to stop, or to indicate that a hazardous condition exists. Automatic cancellation of turn signals is provided after turns are completed. Lane change indications are made possible subject to immediate release of manual pressure without requiring a turn great enough to produce automatic cancellation and without requiring manual override of a latch.

Turn signal and other warning signal switches have been standard equipment on all motor vehicles for many years. They are among the items which have, in the past few years, come under federal safety standards indicating the importance of correctly functioning switches. Furthermore, the number of lamps required to be actuated with the various switches has been increasing so that the current loads imposed on the switches have increased over the years. Also, under the warranty programs presently provided by the automobile manufacturers the warning signal switches have come to constitute one of the major warranty cost items.

Various types of signals are required of warning signal devices for use on motor vehicles. Among these are signals indicating Lane Change, Turn Position, Brake, Hazard Warning and Cornering.

A Lane Change signal is produced when the driver pushes the turn signal lever into a first position, which may be either left or right. The Lane Change signal is terminated when the driver releases the holding force from the control arm of the switch by removing his hand.

A Turn Position signal requires that the signal lever be subjected to a force sufficient to move it to a detented (or second) position. The turn position signal is such that the switch will not move to turn off the signal unless the arm is manually operated or the steering wheel drives a cancelling cam to automatically release the switch upon the completion of the turn.

Brake lights are operated on both sides of the car when the brake pedal is depressed while the turn signal lever is in neutral. They are operated on the side opposite to the direction of turn when the signal lever is in a lane change or in a turn position. The brake circuit is disconnected from the side indicating a turn.

A Hazard Warning signal is produced by actuation of a separate button to indicate an emergency condition by flashing all exterior turn and/or brake lamps independently of the position of the turn signal lever. Associated wiring is arranged so that if the brakes are applied during this period all lamps, both front and rear, will be on continuously, and not flashing.

Cornering signals are supplied to cornering lamps to keep them on continuously whenever the turn signal lever is actuated to either a lane change or a turn position.

The foregoing signals and the switching requirements are all provided by embodiments of the invention in accordance with standards set forth in the SAE Handbooks, published by the Society of Automotive Engineers, Inc., Two Pennsylvania Plaza, New York, N.Y., 10001. Many background details important to the realization of the present invention, including such factors as diameters of steering columns, operation of flashers, bulb size, voltage requirements, test provisions, and the like have been standardized and are set forth in the handbooks. Reference may be made to these standards where particular configurations or particular conditions for operation of the signals may not be clear.

PRIOR ART

At present two major turn signal devices are known to be in vogue, each of which involves a different design philosophy. Both of these have weaknesses which result in functional breakdowns of the switches.

The first of these prior art designs employs a carrier with a pair of spring loaded contacts which drag across a group of fixed terminals to complete electric circuits for the turn signals. This design presents advantages of simplicity and few parts, but the contact strips are subject to excessive wear. This wear affects the positions of the circuit actuation as well as life expectancy.

The second design employs rivets which mate with the eyelet terminals on the wiring harness to complete turn signal circuits. The heads of these rivets constitute the internal contacts of the switch. Contact with these rivet heads is accomplished through a whisker type spring arm which selectively touches each head in the proper sequence. This later design requires precise control of the riveting in order to achieve a functional part. This design also requires a large number of parts.

The first design uses a pair of coil springs to accomplish the cancelling function. This design assures uniform cancellation independently of the surrounding conditions, but requires both a left and a right hand spring.

The second design utilizes plastic shaped into a spring form in the cancelling mechanism. The action of switches constructed in accordance with this design are subject to variations dependent on the ambient moisture and temperature conditions.

The hazard warning function is accomplished in a different manner by switches built in accordance with each of these two prior art designs. The first design calls for wiring for both turn and hazard warning to be brought into a common area. The hazard warning switching is actuated through a many pointed spring member completing contacts for circuits to all corners of the vehicle plus the hazard warning flasher while disconnecting the turn signal flasher. This thin leaf type spring requires very tight tolerances and results in high contact resistances for those circuits handling the heaviest current loads. The second design uses a completely separate switch section to go from normal turn signal conditions to hazard warning conditions. While this simplifies the switch itself, it requires that many of the incoming circuits must be routed through this portion of the device and then on to the indicating part of the package.

The last area of the prior art devices considered to be important to a discussion of the present invention is the method used to obtain a neutral return and the lane change and turn detenting functions. The first design referred to above has two leaf springs, one for neutral return and one operating in conjunction with a plastic form on the carrier to get the detent. Both of these springs are critical in design and in their mounting and location. The second design employs a leaf spring to provide the neutral return and uses a set of plastic fingers and shapes to accomplish detenting. This leaf spring shares the same temperature and moisture problems as the cancelling springs.

SUMMARY OF THE INVENTION

The present invention enables completion of circuits to energize turn signal and hazard warning lights through a number of conductive balls which complete switch contacts through sliding metal plates and leaf springs when a sliding block is moved linearly through operation of lever arms. Cancellation of the signals may be completed either manually or automatically. Manual cancellation is produced by releasing the operated lever arm from a first detent position or by manually overriding a second detent position. Automatic cancellation is provided by a coil spring which is depressed when the turn signal is actuated and which is released through a cam when the indicated action, i.e. turn, has been completed. The assembly of switching components is contained in a small space available under the horn ring in an automobile steering column.

A switch according to the present invention incorporates features which differ from the prior art devices in all the areas that have been discussed above. An exemplary switch employs a unique means to accomplish the switching function. This includes a series of leaf spring terminals fastened securely to a plastic block which is then mounted on a plastic base in a manner which aligns these springs with a hole pattern in the base. Into these holes conductive balls are dropped, each ball having a diameter greater than the thickness of the base so that the surfaces of the balls protrude beyond the base. A flat plate is held against this base within a given set of limits by a carrier and spring. The plate is surfaced with a pattern of conductive areas (similar in form to printed circuit surfaces but generally thicker) so that when the plate is moved across the balls circuits are alternately made or broken in a predetermined manner. The balls are quite easily assembled into the pockets and provide minimum friction and wear, since they are constantly rotated into new positions. This is true even though the contact pressure is maintained by the carrier and spring at a relatively high figure for switches of this type.

The switch employs two coil springs for cancelling. Due to the method of driving the moving part of the switch it is possible to design a common spring for both sides. This avoids the problem of separate tooling and of isolation and orientation in handling. Yet both springs operate about the same plane when they are actuated.

In the present invention, hazard warning switching is accomplished by merely moving the position of the sliding block relative to the base block. This procedure connects the hazard warning flasher feed circuit to the power supply while disconnecting the turn signal flasher feed circuit. This circuit has all of the current capacities of the turn signal and in fact dictates the design of the terminals on the base and the slide block.

With this invention all wiring can be brought into a localized single area, making for a simpler assembly and providing strain relief on the harness. It also simplifies the harness making procedures by providing a plate to which the terminals can be fastened and which remains with the harness throughout its processing and then provides a means of attaching the harness to the base.

Neutral spring and lane change detenting is accomplished by utilizing a coil spring to drive a sliding member against a specially shaped face on the moving arm. In this way, both neutral return and detent action are obtained from the same parts.

This actuation arm is fastened to a hub which is rotated to drive associated elements in an arc through a bearing mounted on the base itself. This arm is coupled to a carrier block which then drives the sliding block in a linear motion. Because of the conversion from circular motion at the hub to linear motion at the switch it is possible to utilize completely all of the space available within the wheel housing for the switching operation. This change in motion may be varied and controlled quite well by varying the length of this cam arm.

In keeping with the foregoing, it is an object of the present invention to provide an improved switching system for turn signal and hazard warning signals in motor vehicles.

It is a further object to provide switching equipment in turn signal and hazard warning devices which is centralized permitting all wiring to be brought into a single area.

It is a further object of this invention to provide switches which are arranged to permit complete coverage of all moving and functional parts of the turn signal so that no mechanical damage can result during handling and shipping. At the same time it is an object to open up those parts of the assembly in proximity to mounting screws so that no damage is done to the switch during assembly.

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a plan view showing an embodiment of the invention positioned in an automobile steering column, FIG. 2 is a partially sectioned view of an embodiment of the invention on an enlarged scale, FIG. 3 is a sectional view along the lines 3—3 of FIG. 2, FIG. 4 is an exploded view showing the relationships among elements of an embodiment of the invention, and FIGS. 5–8 are drawings depicting interrelationships between the mechanical linkages and the electrical contact elements which have been used in the practice of the invention.

DESCRIPTION OF PREFERRED EMBODIMENTS

Figure 1:
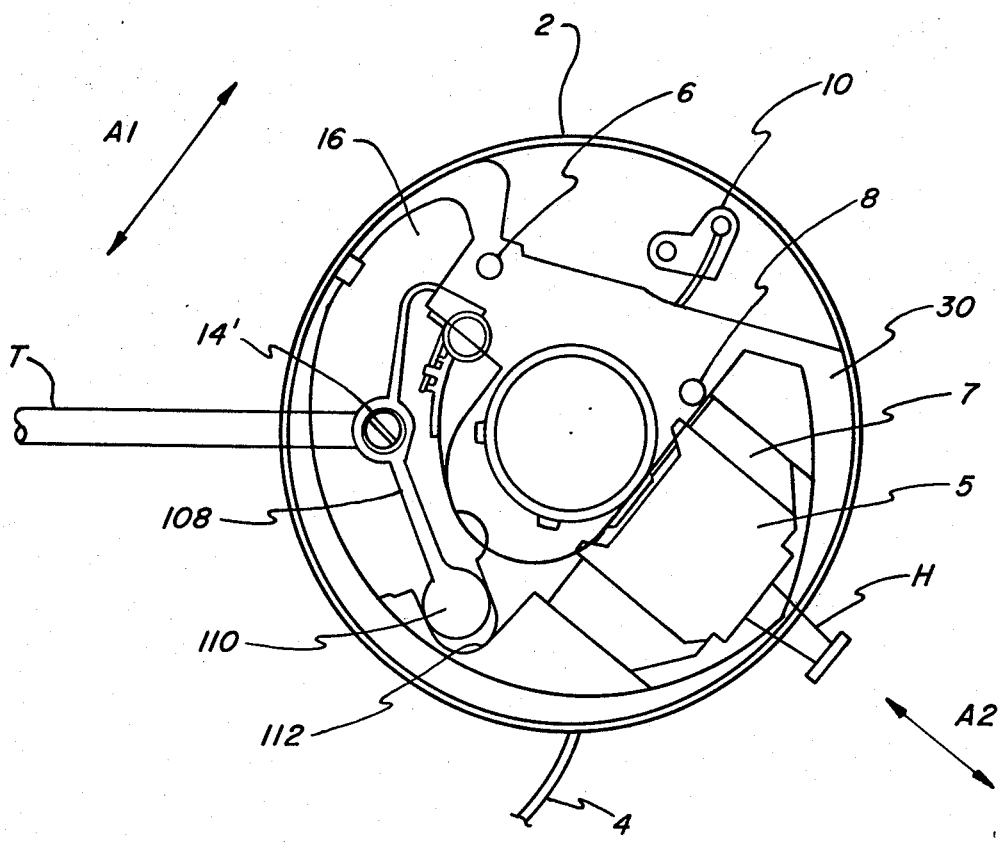

Turn now to FIG. 1 which shows a switch assembly in accordance with the invention as it would appear when positioned within a steering column 2. In this figure a turn signal arm T is shown positioned relative to the steering column 2 approximately as it would be in its neutral position in a motor vehicle. The control for the hazard warning signal switch is shown at H, also in the neutral or unoperated position. The wire harness assembly, through which the switch assembly is connected to the power supply and to the signal elements to be operated, is shown at 4. In a preferred embodiment, a horn ring (not shown) would engage the horn contacts 6 and 8. A suitable cover (not shown) would be placed over the end of the steering column. A key warning ground contact is illustrated at 10. A plate at 16 serves as a combination cover and slide block for the switch assembly.

The plate 16 is shown formed of transparent plastic so that elements located immediately under the plate may be more easily visualized. In a preferred embodiment, the plate 16 serves as a cover for the switch and also provides a part of the mechanical linkage between the turn signal arm T, the hazard warning control device H and the hazard warning carrier at 5.

The hazard warning carrier 5 serves as a retainer permitting sliding motion for switch contacts affixed to the under side of a die-cut contact block slide switch 7. Mechanical linkage from the turn signal arm T is effected through rotation of a slide block 108 about an axis through the screw 14'. When 108 is rotated, its end 110 will push against the surface 112 to force the plate 16 to move generally up or down parallel to the double arrow A1. This motion of the plate 16 causes the contact block slide switch 7 also to move parallel to arrow A1 causing changes in the setting of the switch and thereby energizing turn signal lights. Operation of hazard warning lights is effected by pulling out the control device H along the line A2. Control device H moves the hazard warning carrier 5 radially in the direction of the arrow A2 away from the center of FIG. 1. The carrier 5 pulls the contact block slide switch 7 along to change the setting of the switch to a position causing all the signal lights to operate in unison, regardless of the setting of the turn signal arm T.

Figure 2:
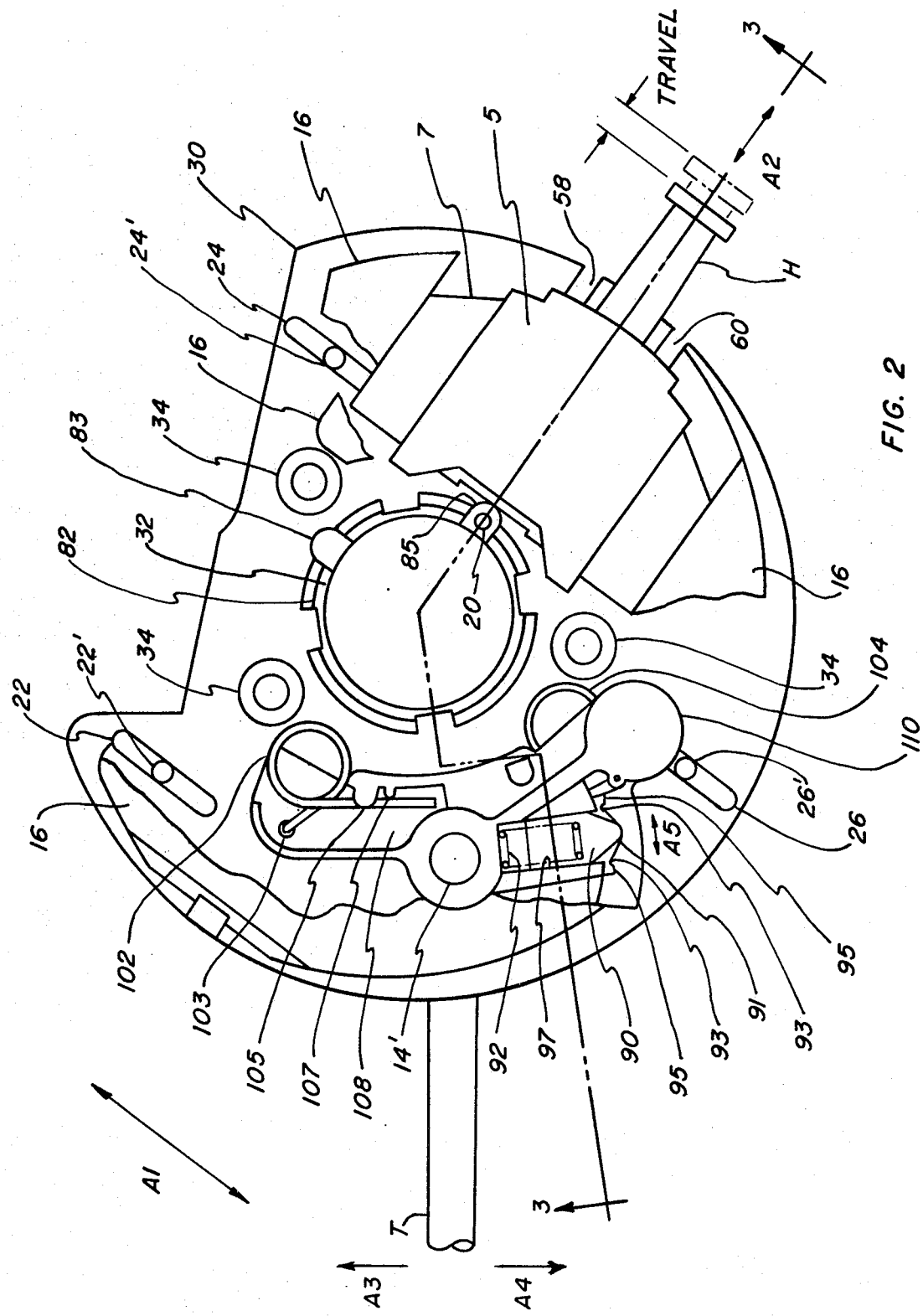

FIG. 2 shows further details of the switch assembly. The combination cover and slide block 16 are shown partially cut-away to facilitate the disclosure of underlying components. This view includes both electrical switch elements and mechanical switch elements. The actual electrical switch elements are represented in this view by the contact block slide switch 7 under which are the electrical contact elements. The mechanical elements include guide slots at 22, 24 and 26 provided in the bottom block 30 to engage guides and guide pins 22', 24' and 26'. The guide pins are attached to the cover and slide block 16 to guide it in an up and down movement parallel to the arrows A1 over the face of the bottom block 30 as the turn signal arm T is actuated. The hazard warning function is controlled by the hazard warning switch control H which can be used in pulling the hazard warning carrier 5, along slots 58 and 60 and other slots in the bottom block 30 (not shown), radially toward and away from the center at the round opening 32 along a line indicated by the arrow A2. The round openings 34 in the bottom block 30 are selected to match mating openings in a flange within the steering column so that the switch assembly can be secured in place.

The mechanical drive group includes the turn signal arm T, the actuator 108, detent block 90, the cover and slide block 16, the hazard warning carrier 5, the contact block slide switch 7, and the arm H. The mechanical group provides mechanical interconnection between the switch controls and electrical circuits where the switch controls are represented by the turn signal arm T and the hazard warning control arm H. The electrical circuits are represented by the coupling to the contact block slide switch 7. The mechanical drive group also includes means providing detent action and automatic return to neutral after a turn has been completed.

Detent action can be understood from FIG. 2, by considering the interaction between the slide block or actuator 108 and the detent block 90 in conjunction with the operation of other elements. When the turn signal arm T is moved up in the direction of arrow A3 to signify a right turn or down in the direction of arrow A4 to signify a left turn, the actuator 108 rotates, as indicated by the arrows A5, about an axis through a screw at 14'. As 108 rotates, the cam surfaces at 91, 93 and 95 move laterally relative to the detent block 90. An opening 97 in the base plate 30 permits motion of the detent block 90 against the bias of a spring 92. This same opening 97 holds the detent block captive against lateral motion paralleling that of the actuator 108.

As a consequence of the arrangement discussed in the last paragraph, the detent block and spring exert a force counter to the motion of the actuator 108 and the arm T, providing "feel" through T to the operator, while tending to restore the actuator and arm T to neutral. As the end of the detent block 90 and one of the cam surfaces 93 come in contact, the pressure required for further motion of the arm T rises noticeably, signailing to the operator that an increase in pressure will be required to latch the turn signal and indicating also that the turn signal lights are operating to provide a "lane change" signal.

At this time, when the detent block 90 and cam surfaces 93 come in contact, the operator can manually keep the signal lights operable by holding the arm T in position, while he changes from one lane of traffic to another and then he can release the arm T, thereby restoring the signal lights to neutral. If the operator desires to set the system so that the signal lights will remain operable until either a full turn is made or he forces the arm T to a neutral position, he can do so by moving the arm T to force the detent block up over the appropriate cam surface 93 to latch at 95.

At the time a full turn position has been registered by moving the end of the detent block 90 into its latch position past 93 and against surface 95, one of the cancelling springs 102 or 104 will be carried by the actuator 108 into close proximity to the cancel cam ring 82. The cancel cam ring is held by a pin at 20 which interlocks with the steering wheel (not shown) to carry cancel lobes at 83 and 85 around as the steering wheel is turned. After a full turn has been completed, one of the cancel lobes 83 or 85 will strike the cancelling spring 102 or 104 causing it to push the actuator 108 back to its neutral position and turning the turn indicator lights "off" again.

The cancelling springs 102 and 104 are fastened to the actuator 108, as best shown with respect to spring 102 in FIG. 2. In this view, one end of spring 102 is held in place through an opening at 103 in the actuator 108 while the other end is held under an overlapping edge 105 and against an edge 107, where 105 and 107 are integral to actuator 108. When the arm T and actuator 108 are in the right turn position, the spring 102 will be positioned near the surface of the cancel cam 82. When a turn is made by turning the steering wheel to the right, the cancel lobes 83 and 85 contact the spring 102 going in the clockwise direction deflecting it in a direction which has no effect on actuator 108 and does not cancel the turn indication. When either cancel lobe 83 or 85 is moved back in a counterclockwise direction after a full right turn, the motion imparted to the cancel spring 102 causes it to push hard against the actuator 108. This action releases the detent block 90 from its latch position, thereby releasing the spring 92 and causing the actuator 108 and the cover and slide block 16 to move back to their neutral positions. The right turn signal will be cancelled automatically.

Figure 3:
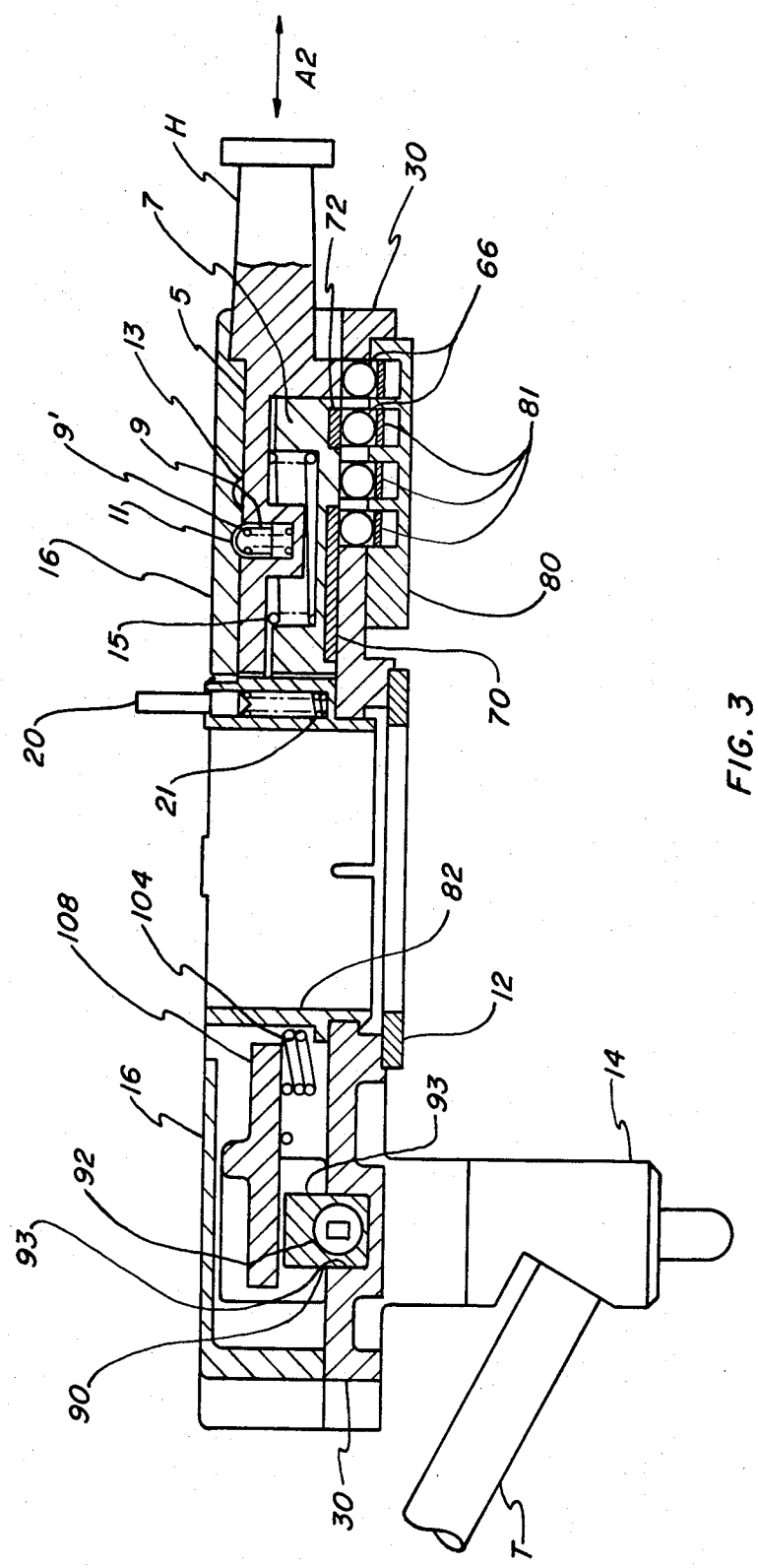

FIG. 3 is a sectional view taken along A—A in FIG. 2. In this view corresponding labels are repeated for the same components and additional details of construction are shown. Sectional views are included of parts of the cover and slide block 16 and the base plate 30 along with a partial section of the hazard warning control arm H.

An aspect of the invention which is shown clearly in FIG. 3 is the relationship between the pick-up pin 20 and the associated spring 21. The function of this combination is to provide a basis for correctly interconnecting the steering wheel (not shown) and the cancel cam ring 82 during assembly. To this end, the pick-up pin 20 is depressed against a ring on the underside of the steering wheel and the steering wheel is turned until a prepared opening accepts the pin 20. Once the pin 20 is pushed into the opening by the spring 21, the steering wheel and the cancel cam ring will lock into place and remain so for so long as the steering wheel is retained on the steering column. This interlock of the steering wheel and cancel cam ring is critical to automatic cancellation of signalling when a full turn has been completed, since it establishes the relative positions of the cancel lobes 83 and 85 to the cancelling springs 102 and 104.

A sectional view of the hazard warning carrier 5 and associated electrical components in FIG. 3 shows the use of a detent device at 9 which is forced by action of a spring 9' into a respective opening 11 or 13 to latch 5 into one of two positions as it is moved in the direction of the arrows A2. A spring at 15 provides pressure between carrier 5 and the contact block slide switch 7, pushing switch 7 and especially contact areas 70 and 72 down against the baseplate 30 and respective ball contacts 66. The ball contacts 66 in turn press against wire spring contacts at 81 on the connector block 80. The wire spring contacts 81 provide connections to the various signal lights and the power supply.

The nature of the connection between the turn signal arm T and the switching elements is shown in FIG. 3 where it can be seen that the arm T fits into an opening in the mounting hub 14. When the arm T is moved, the hub will turn causing the actuator 108 to rotate and move the cover and slide block 16. Motion of the block 16 is imparted, as previously indicated, to the contact block slide switch 7 to establish electrical connections and energize the turn signal lights. The relationships of the switching elements are discussed more fully in connection with other figures in this application.

Figure 4:
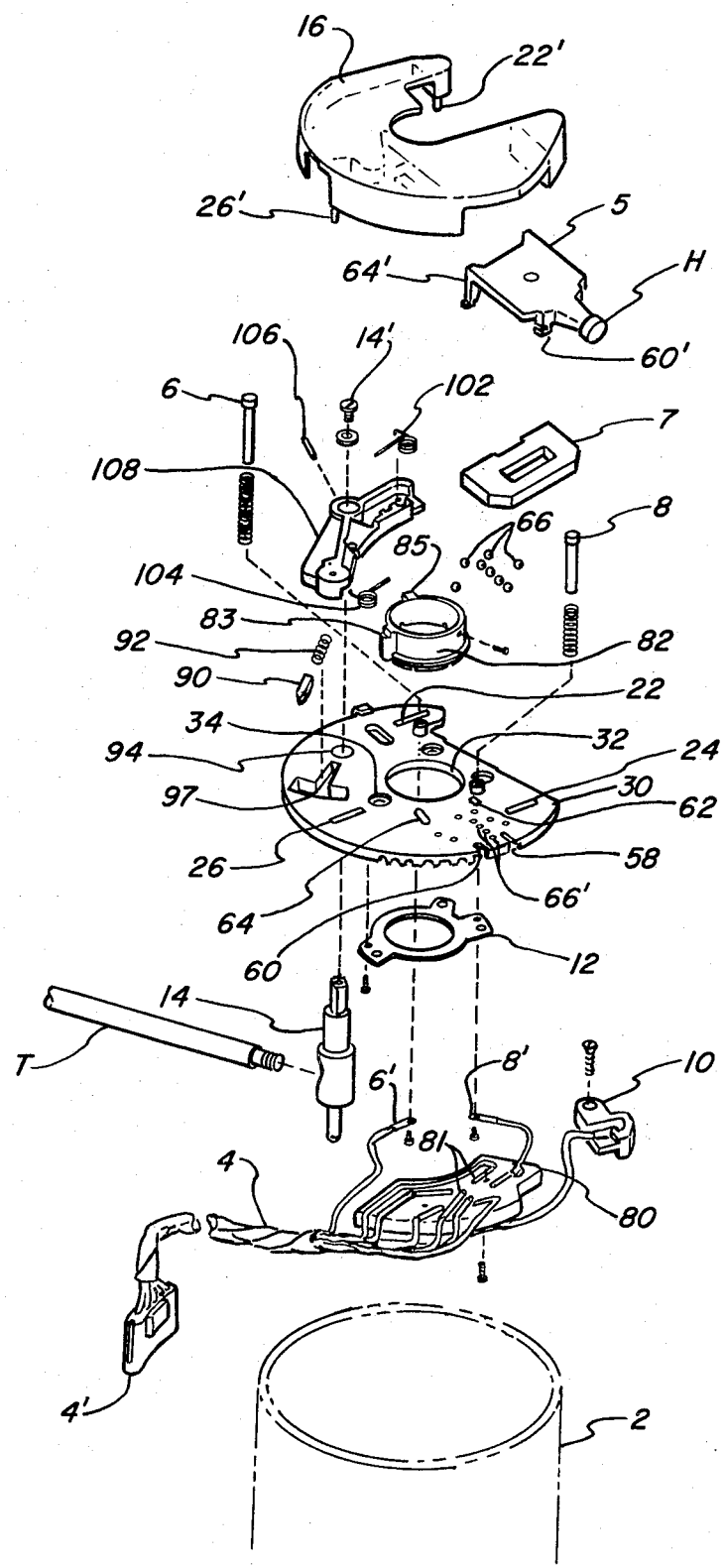

FIG. 4 is an exploded view showing the relationships of many of the components discussed with respect to FIG. 1–3 and showing additional components and aspects of the invention. The numbering of components is, of course, consistent with that previously used.

From FIG. 4, it is apparent that the leaf springs 81 on the connector block 80 are connected to various conductive lines in the cable harness 4. Similarly, the key warning ground contact 10 and the horn contact terminals 6' and 8' are connected to the cable harness. The cable harness, in turn, is connected via coupling 4' and additional cable elements to battery, flashers, and to various warning signals in a conventional way.

In FIG. 4, the bottom block 30 is shown in further detail. In this view it is clear that a number of slots 22, 24 and 26 are provided. These slots serve to guide the cover and slide block 16 through contact with elements such as 22' and 26'. Similarly, guide slots 58, 60, 62 and 64 are provided to guide corresponding elements, (60' and 64' are shown) which are part of the hazard warning carrier, when it is operated. The holes at 66' receive and retain contact balls 66. The opening 32 is the opening through which the steering column (not shown) would pass. A bearing retainer plate at 12 is provided under the base plate or bottom block 30 for mechanical contact between the steering column and the switch assembly. Elements in FIG. 4 which have not been discussed elsewhere include a pin 106 which may be used in securing the actuator 108 to the mounting hub 14. The opening 94 in the base plate, or bottom block 30, receives one end of the mounting hub.

To further clarify the nature of the switching operation performed by the present invention attention is directed to the simplified drawings indicated by FIGS. 5, 6, 7 and 8. Each of these figures represents a view of the position of the switching mechanism and the alignment of contacts in a particular situation. In order to show the action of the mechanical linkage, the positions of the arm T and actuator 108 are shown as if the combination cover and slide block 16 were formed of transparent plastic material (a fact in a model used in preparation of this disclosure). In order to demonstrate the relative positions of the contact elements those portions are shown as if the top of the hazard warning carrier and the contact block slide switch were stripped away to expose the contact areas 70 and 72 on the underside of the contact block slide switch. In the same views, the positions of the ball contacts 66 are shown to provide an indication of the relationships between the ball contacts and the contact areas 70 and 72.

Figure 5:
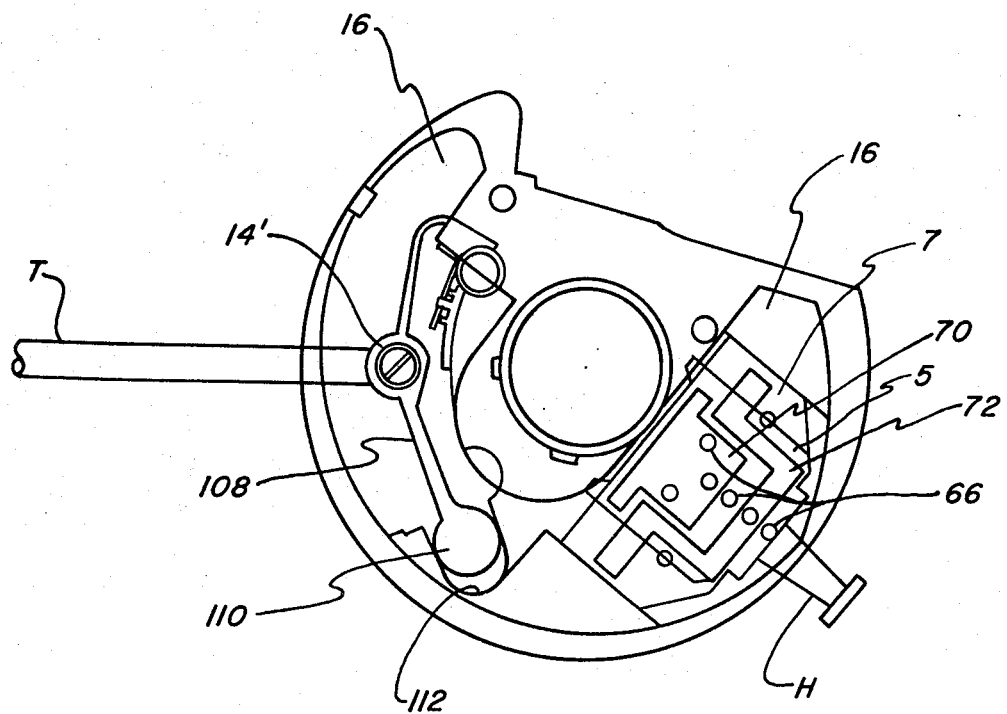

FIG. 5 shows the switch in the "off" state corresponding to that indicated in FIG. 1. As indicated above, this Figure is shown with the hazard warning carrier and the contact block slide switch indicated only in outline. This enables the relationships between the contact elements 70 and 72 and the contact balls 66 to be seen and provides a showing of the relative positions of the contacts when the turn indicator and the hazard warning indicator are both in their neutral position and no warning signals are in operation.

Figure 6:
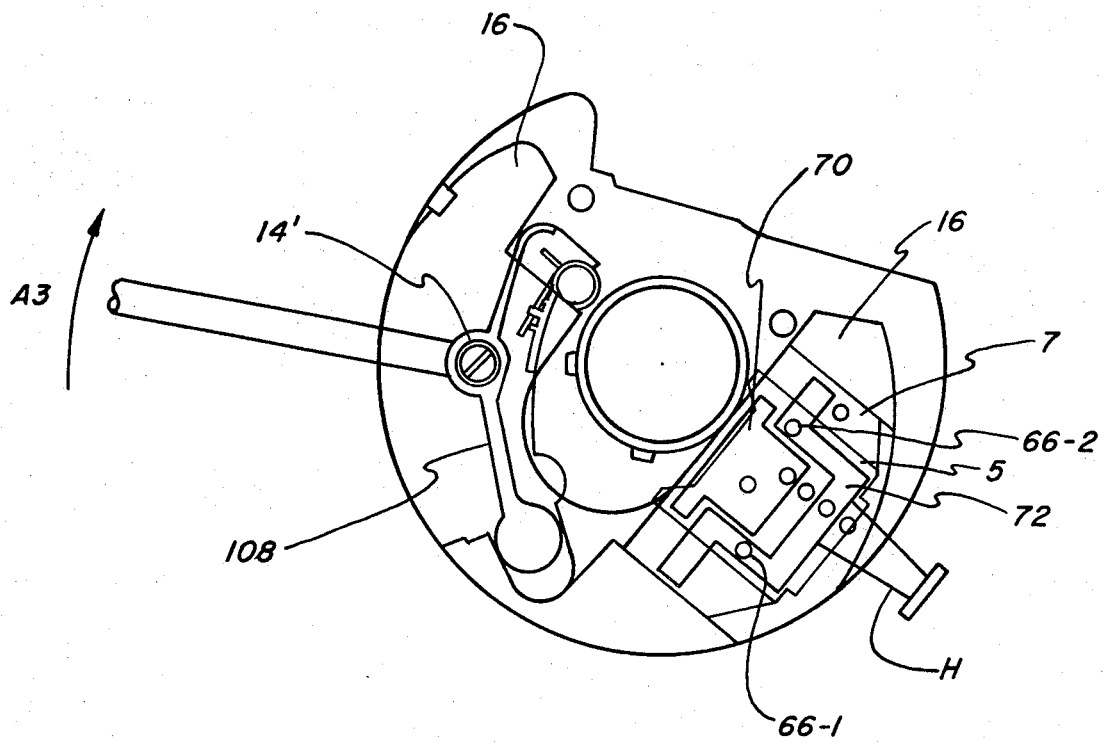

FIG. 6 shows the changes in the linkage positions and the positions of the contacts when the arm T is pushed "up" along the arrow A3 into the right turn position. Here it will be noted that the slide block or actuator arm 108 has swung around the pivot at 14' carrying the slide-cover 16 and the contact block slide switch 7 to new positions. Now the contact balls 66-1 and 66-2 are in new positions establishing contact with the contact element 72 while the other contact balls remain in contact with the same surfaces. The resulting new arrangement of contacts establishes, via the wiring harness 4, complete circuits to operate the right turn warning signals (not shown).

Figure 7:
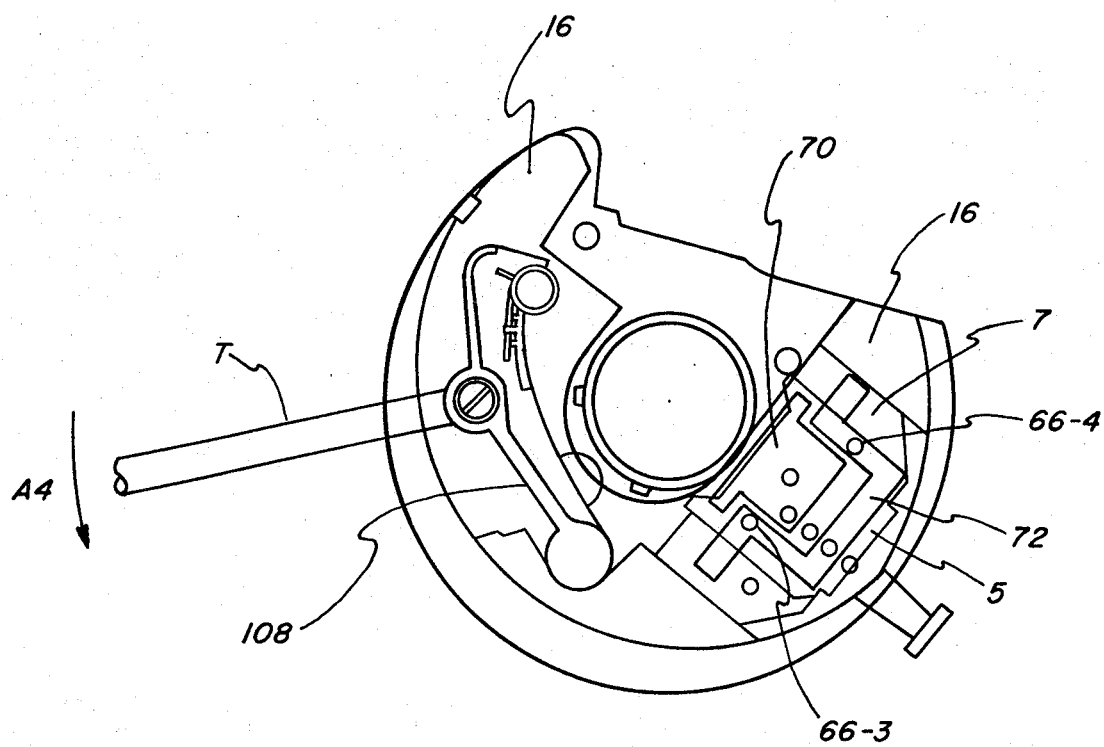

FIG. 7 illustrates the changes caused in the mechanical linkage and in the contact arrangements when a "left turn" is signaled by pulling the arm T down in the direction of the arrow A4. In this example, the arm 108 has been swung around to carry the slide-cover 16 and the contact block slide switch 7 to the position shown. The contact balls 66-3 and 66-4 are brought into contact with contact element 72 while the other balls maintain the same contacts they had in the neutral position. A circuit is completed through the new arrangement of contacts and the wiring harness to enable left turn indicator lights and other warning signals (not shown) to be operated.

Figure 8:
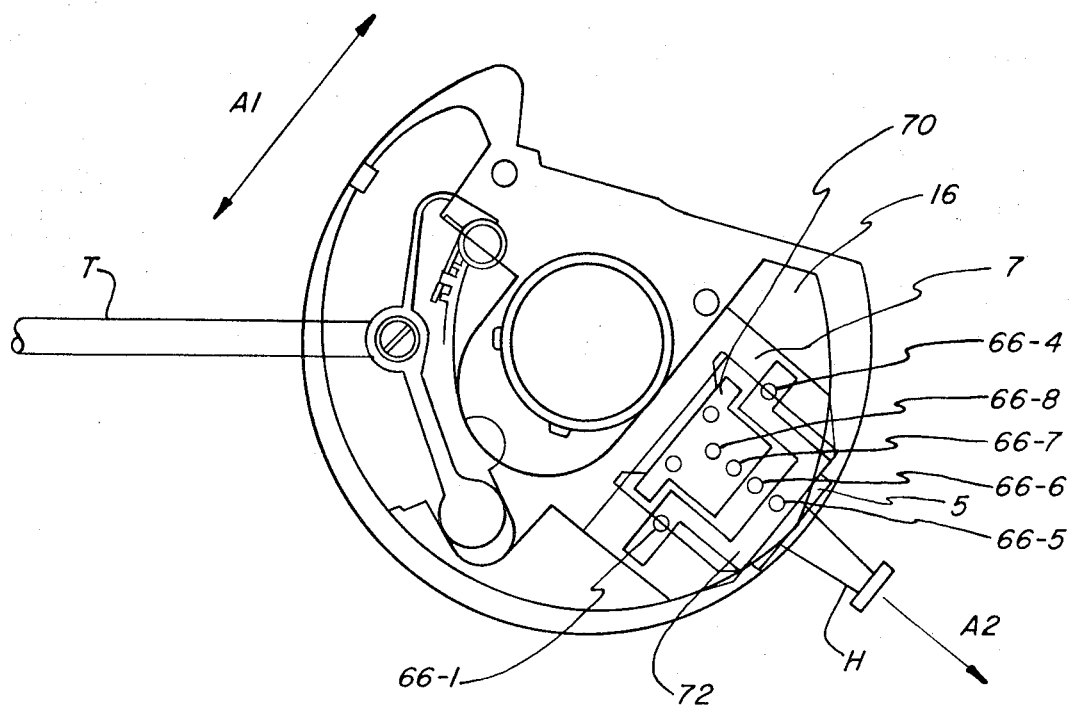

FIG. 8 illustrates the state of the mechanical linkages and of the electrical contacts when the turn indicator lever T is in neutral and the hazard warning device in "on." In this Figure, the lever T, the actuator arm 108 and the cover 16 are in the same position they occupied in FIGS. 1 and 5. However, the arm H is shown pulled out, as indicated by the arrow A2, along with the hazard warning carrier 5 and the contact block slide switch 7. In this position, contact is established to all the turn indicator lights through completion of new contacts between 66-1, 72, 66-4 and 66-5, maintenance of contacts between 66-2, 66-3, 66-8 and 70 and new contacts between 66-7 and 70 while the contact between 66-6 and 72 is broken. It will be seen in FIG. 5 that once the hazard arm has been operated no change in the closed contacts will be produced by motion of the arm T and the contact block slide switch. This will be seen to be so, since any motion in the direction of the arrows A1 will leave each of the balls 66 in contact with the same respective contact element 70 or 72.

While the principles of the invention have been described above in connection with specific apparatus and applications, it is to be understood that this description is made only by way of example and not as a limitation on the scope of the invention.

We claim:

1. A switching system for providing warning signal indications in motor vehicles comprising
    a first plurality of contacts including a plurality of wire spring contacts,
    plate means having one face supporting said wire spring contacts in a fixed planar pattern,
    means aligning a plurality of ball contacts for individual support by the wire spring contacts,
    means enabling cable connections to be established with said wire spring contacts, whereby electrical signals may be transmitted through said wire spring contacts and said ball contacts,
    a movable slide,
    a second plurality of contacts formed as flat conductive surfaces in association with the movable slide, and
    means for moving said movable slide along a linear path to establish conductive relationships with different ones of said first plurality of contacts and complete selected circuits through said flat conductive surfaces and selected ones of said ball contacts to the first plurality of contacts.

2. A switching system as claimed in claim 1, in which the means aligning said wire spring contacts includes a plurality of holes arranged in a preselected pattern to receive said ball contacts.

3. A switching system as claimed in claim 1, including a turn indicator lever, the means for moving said movable slide including a mechanical linkage operated by the turn indicator lever for providing the sliding motion in a linear path to the movable slide to move it relative to the first plurality of contacts, and
    the position of said movable slide relative to said first plurality of contacts establishing selected complete circuits.

4. A switching system as claimed in claim 1, in which the means for moving said movable slide includes a mechanical linkage and a hazard warning mechanical control coupled to the mechanical linkage for providing sliding motion to the movable slide along a linear path at an angle relative to the first path, and
    a particular selected position of said movable slide relative to said first plurality of contacts establishes circuits to enable operation of signals indicating a hazardous state.

5. A switching system as claimed in claim 1, in which the means for moving said movable slide includes a first mechanical linkage from a turn indicator for providing sliding motion to the movable slide in the linear path relative to the first plurality of contacts,
    the means for moving said movable slide also includes a second mechanical linkage and a hazard warning mechanical control coupled to the mechanical linkage for providing sliding motion to the movable slide in a different direction relative to the first plurality of contacts, and
    the position of said movable slide relative to said first plurality of contacts establishes a selected complete circuit to enable operation of selected signals.

6. A switching system as claimed in claim 1, in which the means for moving said movable slide includes a mechanical linkage from a turn indicator lever for providing sliding motion to the movable slide relative to the first plurality of contacts, and
    the mechanical linkage includes a detent device to impart "feel" to the turn indicator lever to enable the user to distinguish between a first position representing a lane change position and a second position representing a turn position.

7. A switching system as claimed in claim 1, in which a canceling cam is provided,
    the means for moving said movable slide includes a mechanical linkage from a turn indicator lever for providing sliding motion to the movable slide relative to the first plurality of contacts,
    the mechanical linkage includes a detent device, and the detent device holds the turn indicator lever in a turn position, once such a position has been reached, until released manually or by operation of the canceling cam after the turn has been completed.

8. A switching system as claimed in claim 1, in which
the system includes contacts for completing a circuit to operate signals on the side opposite the direction of a turn in cooperation with the operation of a brake circuit.

9. A switching system as claimed in claim 1, in which
the means for moving said movable slide includes a mechanical linkage from a turn indicator for providing sliding motion to the movable slide relative to the first plurality of contacts, and
said system provides contact closures over which can be conveyed a continuous signal to cornering lights on the same side of the vehicle as the lane change or the turn signal.

10. A switching system as claimed in claim 1, in which
the means for moving said movable slide includes a mechanical linkage from a turn signal lever providing sliding motion to the movable slide relative to the first plurality of contacts,
the mechanical linkage includes a detent device, and
said detent device includes latching means to latch the system in an alarm sounding status when the signal lever is operated beyond a first detent condition.

11. A switching system as claimed in claim 10, in which
release means are provided for automatically releasing the system from the latch status when a turn is completed,
said release means including a cam surface having a cancel lobe and a cancel spring associated with the mechanical linkage,
said cancel lobe and said cancel spring cooperating to release the latching means as the cam surface is rotated past a position indicating completion of a turn.

12. A switching system as claimed in claim 1, in which
the means for moving said movable slide includes a first mechanical linkage from a turn indicator for providing sliding motion to the movable slide to a first position relative to the first plurality of contacts, and
the means for moving said movable slide also includes a second mechanical linkage to a hazard warning mechanical control for providing sliding motion to the movable slide to a second position relative to the first plurality of contacts, whereby
the second position of said movable slide relative to said first plurality of contacts establishes selected complete circuits to enable operation of hazard warning signals regardless of the first position of the movable slide.

13. A switching system as claimed in claim 7, in which a cancelling spring is coupled to said mechanical linkage,
said cancelling cam includes a cancel lobe, and
the detent device is released by coaction between said cancelling spring and said cancel lobe after the turn has been completed.

14. A switching system as claimed in claim 1, in which
the means for moving said movable slide includes a mechanical linkage operated by a turn indicator for providing sliding motion to the movable slide relative to the first plurality of contacts, and
the position of said movable slide relative to said first plurality of contacts establishes selected complete circuits.

15. A switching system as claimed in claim 1, in which
the means for moving said movable slide includes a mechanical linkage to a hazard warning mechanical control for providing sliding motion to the movable slide in a direction at an angle relating to the direction of the first linear path, and
a particular selected position of said movable slide relative to said first plurality of contacts establishing circuits to enable operation of signals indicating a hazardous state.

16. A switching system as claimed in claim 1, in which
the means for moving said movable slide includes a first mechanical linkage from a turn indicator for providing sliding motion to the movable slide relative to the first plurality of contacts,
the means for moving said movable slide also includes a second mechanical linkage to a hazard warning mechanical control for providing sliding motion to the movable slide in a different direction relative to the first plurality of contacts, and
the position of said movable slide relative to said first plurality of contacts establishes a selected complete circuit to enable operation of selected signals.

17. A switching system as claimed in claim 1, in which
said first plurality of contacts and said means enabling cable connections are located on a connector block, and
said connector block includes means by which connections through the switching system may be speedily and automatically completed.

18. In a switching system for providing warning signal indications in motor vehicles, switching means comprising
a baseplate through which pass a plurality of openings in a fixed pattern,
a plurality of wire spring contacts fastened in a planar pattern across the openings along one face of the baseplate,
a plurality of ball contacts resting in said openings upon the wire spring contacts,
means enabling cable connections to be established with said wire spring contacts, whereby electrical signals may be transmitted to operate warning indicators,
a movable slide,
a plurality of contacts formed as flat conductive surfaces in association with the movable slide, and
a slide block plate retaining said movable slide and guiding the movable slide along a linear path to establish conductive relationships with selected pluralities of said ball contacts and thereby to complete selected circuits through said flat conductive surfaces and selected ones of said plurality of wire spring contacts.

19. In a switching system as claimed in claim 18, means including
a turn indicator lever
said slide blade plate including a mechanical linkage operated by the turn indicator lever for providing sliding motion to the movable slide relative to the ball contacts, whereby
the position of said movable slide relative to said first plurality of contacts establishes selected complete circuits.

20. In a switching system as claimed in claim 18, further means including
a hazard warning arm fastened to said movable slide, said hazard warning arm responding to the application of force to pull said movable slide along a second linear path and establish a new pattern of connections between said second plurality of contacts and said ball contacts, thereby to enable the establishment of connections over further additional selected circuits and provide hazard warning signals.

* * * * *